United States Patent [19]

Bardsley, III et al.

[11] 4,205,374

[45] May 27, 1980

[54] METHOD AND MEANS FOR CPU RECOVERY OF NON-LOGGED DATA FROM A STORAGE SUBSYSTEM SUBJECT TO SELECTIVE RESETS

[75] Inventors: Henry Bardsley, III, Saratoga; Fernando A. Luiz, Monte Sereno, both of Calif.; Nils F. Nilsen, Tucson, Ariz.; Ronald C. Simpson, San Jose, Calif.

[73] Assignee: International Business Machines Corporation, Armonk, N.Y.

[21] Appl. No.: 953,063

[22] Filed: Oct. 19, 1978

[51] Int. Cl.² ............... G06F 11/00; G06F 13/00
[52] U.S. Cl. ............................. 364/200; 371/9
[58] Field of Search ............ 235/303.3, 301; 364/200, 900

[56] References Cited

U.S. PATENT DOCUMENTS

| | | | |
|---|---|---|---|
| 3,336,582 | 8/1967 | Beausoleil et al. | 364/200 |
| 3,400,372 | 9/1968 | Beausoleil et al. | 364/200 |
| 3,564,502 | 2/1971 | Boehner et al. | 364/200 |
| 3,704,363 | 11/1972 | Salmassy et al. | 364/200 |
| 3,928,830 | 12/1975 | Bellamy et al. | 364/900 |
| 3,958,111 | 5/1976 | Hackett | 235/303.3 |
| 3,964,056 | 6/1976 | Charpentier et al. | 235/303.3 |
| 4,099,234 | 7/1978 | Woods et al. | 364/200 |
| 4,133,027 | 1/1979 | Hogan | 235/303.3 |
| 4,141,066 | 2/1979 | Keiles | 235/303.3 |

*Primary Examiner*—Leo H. Boudreau
*Attorney, Agent, or Firm*—R. Bruce Brodie

[57] ABSTRACT

A method and means for the recovery of non-logged data by a CPU/channel from a storage subsystem, which data would normally be overwritten upon the subsystem being RESET by the CPU/channels. A defaulting control unit simultaneously initiates a DISCONNECT IN sequence to its attaching channels and sets an appropriate status bit at a control unit/control unit communications interface. The channel responds to the DISCONNECT IN with a SELECTIVE RESET interface sequence which sequence is buffered by the defaulting control unit. Meanwhile, the companion functioning control unit, when operating at its lowest interrupt level, polls the status bit periodically and offloads data registers through the interface connection from the defaulting unit within a predetermined time. At the end of this interval, the SELECTIVE RESET is honored, thereby erasing all data in the defaulting control unit registers.

6 Claims, 6 Drawing Figures

FIG. 2  SELECTIVE CONTROL UNIT DATA AND CONTROL PATHING

FIG. 4    LOGIC FOR ERROR ALERT PROCESSING

TIMING DIAGRAM

METHOD AND MEANS FOR CPU RECOVERY OF NON-LOGGED DATA FROM A STORAGE SUBSYSTEM SUBJECT TO SELECTIVE RESETS

DESCRIPTION

1. Technical Field

This invention relates to a method and means for the automatic recovery of data from a storage subsystem accessed by multiple CPU/channels, and more particularly for the automatic recovery of non-logged data subject to being overwritten when a defaulting portion of said storage system invokes a RESET from accessing CPU/channels.

2. Prior Art

In the prior art, as for example described in Clark et al, U.S. Pat. No. 3,725,864, "Input/Output Control", the transfer of data to and from a CPU and the accessed location of storage devices, there was employed a physical path connection involving a channel, a control unit communicating with the channel on one side in an asynchronous relationship and selected devices on the other side. The operating system of the CPU initiated the transfer by a START I/O instruction. This caused control to be relinguished to a series of channel commands (CCW). A sequence or chain of channel commands was, in turn, sent from the CPU over the channel to the control unit for selecting and accessing the storage device as well as effectuating the data movement across the interface. Further, as pointed out by Clark, a CPU was connectable to a device only over this dedicated path for a given channel program. Disconnection and reconnection over any other path involved executing a new START I/O operation. Each channel program would consist of a sequential list of operations resident in the CPU main memory, the transmission to and the execution at the control unit of the CCW taking place only after initial connection between the CPU and the control unit.

A storage subsystem typically comprises a plurality of control units cross-connecting multiple CPU's to DASD's. Errors, whether caused by noise, defects on the storage media, command, or data overrun are variously corrected at the lowest control echelon possible. Typically, a bit stream error detected by an ECC device when data is moved to or from a DASD to a control unit can be preferably corrected at said DASD rather than the control unit. Overrun error due to lack of appropriate synchronism between the channel, control unit, and DASD may be cured by command retry. Command retry is a method in which the control unit reinvokes either a partially or unexecuted present CCW from the channel.

With the advent of data logging a statistical data record of usage and error information for each physical device and for physical storage volumes within each physical device may be maintained for many classes of error. Such a system for a multi CPU shared access DASD storage subsystem is described in Salmassy et al, U.S. Pat. No. 3,704,363, "Statistical And Environmental Data Logging System For Data Processing Storage Subsystem". As pointed out by Salmassy, the storage subsystem maintains a statistical data record or usage and error information for each logical device in the subsystem. The usage information provides an accumulated account of the total number of access motions and data bytes read. The error information provides an accumulated count of the total number of SEEK ERRORS, ECC CORRECTABLE and UNCORRECTABLE DATA ERRORS. Significantly, the usage error information is offloaded and ultimately stored on the storage devices (DASD or tape). This occurs each time one of the usage or error counters reaches a predetermined threshold. The logging requires the controls and data paths within the control unit and its channel correction remain operable. When a critical component within the control unit fails, then it initiates a DISCONNECT IN to the channel. This invites a SELECTIVE RESET to be returned by the channel to the control unit. The effect upon the control unit is to disconnect it from the channel and to cause the contents of all control unit registers to be reset. Thus, the nonlogged error data is unavailable for either automatic recovery or maintenance purposes. Parenthetically, Bellamy, U.S. Pat. No. 3,928,830 is directed to the latching up of errors in a field replaceable unit (FRU) and providing either a permanent display of said errors until manually reset or their logging out. Lastly, R. N. Snively et al, in the IBM Technical Disclosure Bulletin vol. 19, No. 9, pages 3590–91, February 1977 disclosed a method for collecting error information about devices normally attached to a multidropped parallel interface of tag in/out, bus in/out type as the interface partially degrades. Snively's method included the steps of (1) detecting anomalies in the tag or bus transfers, (2) sending an error alert to a control unit, and (3) enabling each attached device by a control unit originated signal to send data over a dedicated counterpart conductor in the bus/in portion of the interface.

Prior art multi-CPU shared device access storage systems included pairs of control units and pairs of CPU's cross-coupled over paths dedicated to the exchange of data. This may be found in Charpentier, U.S. Pat. No. 3,964,056 "System For Transferring Data Between Central Units And Controlled Units". Charpentier discloses a system using a dedicated signal path (direct link, FIG. 1 EXM and IPL). This dedicated path facilitates peer coupling of one CPU to a shared DASD subsystem upon the availability of said CPU's original access path. Charpentier requires three accessing echelons. These are namely central units, controlled units, and peripheral units interconnecting the central units to the controlled units. The direct CPU/CPU transmission link exists as a through connection for (1) transmitting access requests to remote coupled resources over an alternate path and (2) receiving acknowledgement in the reverse direction.

Other examples of a direct CPU/CPU link may be seen in Beausoleil, U.S. Pat. No. 3,400,372, "Terminal For A Multi Data Processing System" and Lange, IBM Technical Disclosure Bulletin Vol. 17, Pages 525–527, July 1974. Beausoleil shows the use of a channel-to-channel adapter in which a terminal may be coupled selectively to either computer by way of the adapter through the IO channel connection. Relatedly, Lange, facilitates a dedicated signal path between control units for the setting/resetting of hardware locks in order to avoid both control units accessing the same shared DASD simultaneously.

THE INVENTION

It is accordingly an object of this invention to devise a method and means for notifying an accessing channel of the unavailability of a defaulting control unit on one hand and to cause non-logged data to be communicated to a common CPU on the other hand. It is a related object to devise a method and means in which channel accessing the storage subsystem will avoid a channel hang condition, or time out, while data is being removed from a defaulting control unit to a CPU/channel.

The above objects are satisfied by a method and means in which the invocation of a trouble signal originating within a defaulting control unit involves notifying an accessing channel of control unit unavailability and causing non-logged data to be peer coupled by an asynchronous and companion element to a common CPU/channel. If the system response to the trouble signal is buffered by the defaulting control unit, then channel hang is avoided, since the accessing channel merely sees a CONTROL UNIT BUSY status indication if it attempts to establish new connections.

As may be recalled, when a subsystem or portion thereof was being RESET by the CPU/channels non-logged data is normally overwritten (set to zero). Such information may be recovered if a defaulting control unit simultaneously initiates a DISCONNECT IN sequence to its attaching channels and sets an appropriate status bit at a control unit/control unit communications interface. The channel responds to the DISCONNECT IN with a SELECTIVE RESET, which is buffered by the defaulting control unit. At the same time, a companion functioning control unit, when operating at its lowest interrupt level, polls the status bit periodically and offloads the error data registers through the interface connection from the defaulting unit within a predetermined time. At the end of this interval, the SELECTIVE RESET is honored, thereby erasing all data in the defaulting control unit registers.

Where control units can be arranged in close physical proximity, then advantage may be taken of the reduced communication path costs to implement a multiple use control unit/control unit interface. As used in this invention, this permits the fact and reason of degraded performance in a defaulting control unit to be communicated in near real time to a common host.

The foregoing and other objects, features, and advantages of the invention will be apparent from the following more particular description of the invention as illustrated in the accompanying drawing.

DESCRIPTION OF THE BEST MODE AND INDUSTRIAL APPLICABILITY

Figure 1:
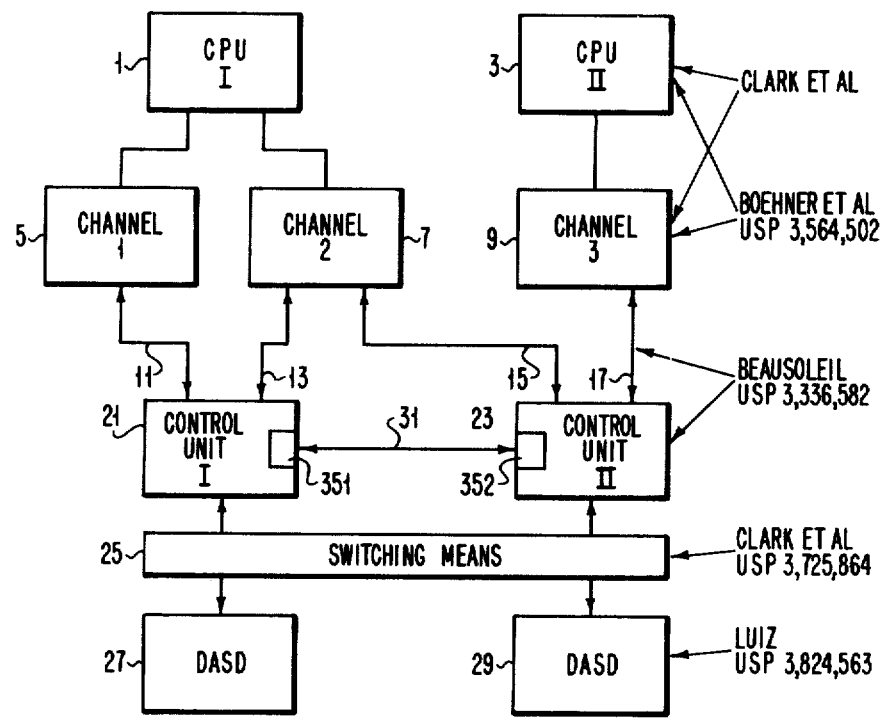
FIG. 1 shows a multi CPU sharing access to multiple DASD through multiple channels and control unit paths as in the prior art with the addition of a control unit/control unit interface between a control unit pair.

Referring now to FIG. 1, there is shown a first CPU 1 and a second CPU 3 coupled to corresponding control units 21 and 23 over channels 1 and 2 (paths 11, 13) and channels 2 and 3 (paths 15, 17). The control units share access to direct access storage devices (DASD's) 27 and 29 over switching means 25. It would be helpful to consider the relations among a single task initiated at CPU1, the dedicated path connection between CPU 1 and DASD 27 in relation to the command and data pathing according to the prior art found in the aforementioned Clark patent and further described in Beausoleil, U.S. Pat. No. 3,336,582, and Boehner, U.S. Pat. No. 3,564,502.

The first active connection for data transfer and disconnected mode for device control of CCW's is that of an initial selection sequence. This sequence is invoked with a START I/O operation in which an initial path is set up both electrically and logically in terms of a device address (virtual/real) and device status (available/busy). The next active connection relates to that of CCW transfer and execution. A control CCW such as a SEEK requires physical positioning or activity at the device. A control unit, in response to receipt of a control CCW can execute the CCW in disconnected mode. This means that the control unit disconnects from the channel while executing the indicated operation. The control unit does not require any more channel activity until it reconnects to said channel. In a typical IBM 370 system as described in the above named references, after a control unit has received a SEEK CCW and the parameters (target address), it disconnects for 30 milliseconds or more. The 30 milliseconds is an average time it takes to dispatch an accessing arm of a DASD in order to arrive at the tracks of a cylinder of interest. During this "dead time" both the channel and the control unit are free to establish other connections. In contrast to disconnected modes, CCW's involving the movement for transfer of data between the channel and the device such as READ or WRITE CCW's require the control unit to remain connected to the channel in order to effectuate the data transfer.

Each CCW must be obtained from a list in the CPU main memory and transferred over the channel to the control unit. At the control unit the CCW is executed. Subsequent to execution, there occurs an ending sequence. If the CCW is of the control type requiring device positioning, the control unit disconnects from the channel and must also reconnect when the control unit or device positioning has been completed. It is then followed by an ending sequence. The ending sequences are of two types. These are the chained ending sequence as between CCW's in the same sequence and non-chained. The non-chained ending sequence references the last CCW in a given series.

Control unit reconnection to the channel is permissive with respect to the channel. After the channel acknowledges the reconnection request by way of a "grant request" signal, then the control unit transmits both control unit and device identification. The channel, responsive to the control unit and device ID uses said ID as a pointer which permits the channel to reorient to the channel program of interest.

FIG. 1 shows that each control unit has three distinct interfaces. These are respectively the channel/control unit, the control unit/device and the control unit/control unit interfaces. All of them are of the asynchronous demand/response type consisting of a data bus and parallel tag (control) lines. The activation of one or more control lines polled in a given direction define both the function to be performed by the receiving side of the interface as well as the validity of any concommitant information on the bus. In this regard, the control unit/control unit (CU/CU) interface 31 is depicted logically in FIGS. 2 and 3.

For a detailed description of the channel/control unit interface including a definition of the bus and tag lines, especially an operational description of the interface sequences reference should be made to Amdahl, U.S. Pat. No. 3,400,371, "Data Processing System", and Beausoleil, U.S. Pat. No. 3,336,582. In this regard, some comment relative to the interface sequences is pertinent to understanding the invention. The sequences of interest include the CONTROL UNIT BUSY sequence, CONTROL UNIT INITIATED sequence, and the DISCONNECT IN sequence. Also, some comment with respect to INTERFACE DISCONNECT and SELECTIVE RESET would be appropriate.

If a DASD is addressed and the control unit to which it is attached is busy, the control unit responds with a status byte indicating the busy condition. The sequence begins when the channel places the device address on BUS OUT and raises ADDRESS OUT. The SELECT OUT is then raised. The control unit then puts a status byte containing CONTROL UNIT BUSY on BUS IN. It afterwards raises STATUS IN. After accepting the status byte, the channel drops SELECT OUT. The control unit responds by dropping STATUS IN and disconnecting from the interface.

The control unit initiated sequence arises when any control unit requires service. It raises REQUEST IN to the channel. The next time SELECT OUT rises at this control unit, the control unit places the address of the DASD on the BUS IN and signals both ADDRESS IN and OPERATION IN. When the channel recognizes the address, COMMAND OUT is sent to the control unit indicating proceed. After ADDRESS IN drops, the channel responds by dropping COMMAND OUT.

The control unit recognizes INTERFACE DISCONNECT when the ADDRESS OUT is up and SELECT OUT is down by a predetermined time prior to the completion on any signal sequence. When OPERATION IN drops, the channel may drop ADDRESS OUT to complete the INTERFACE DISCONNECT sequence. The control unit responds to the interface disconnect by removing all signals from the interface.

DISCONNECT IN provides each control unit with the ability to alert the channel of a malfunction that is preventing the control unit from properly operating over the channel/control unit interface. The DISCONNECT IN can be raised by the control unit only when it is connected to the channel. The channel in response to DISCONNECT IN performs a SELECTIVE RESET.

SELECTIVE RESET is issued only as a result of a malfunction detected at the channel or a time out by the channel. It is manifest whenever SUPPRESS OUT is up and OPERATION OUT drops. This condition causes OPERATION IN to fall and a particular control unit and its status to be RESET.

Figure 2:
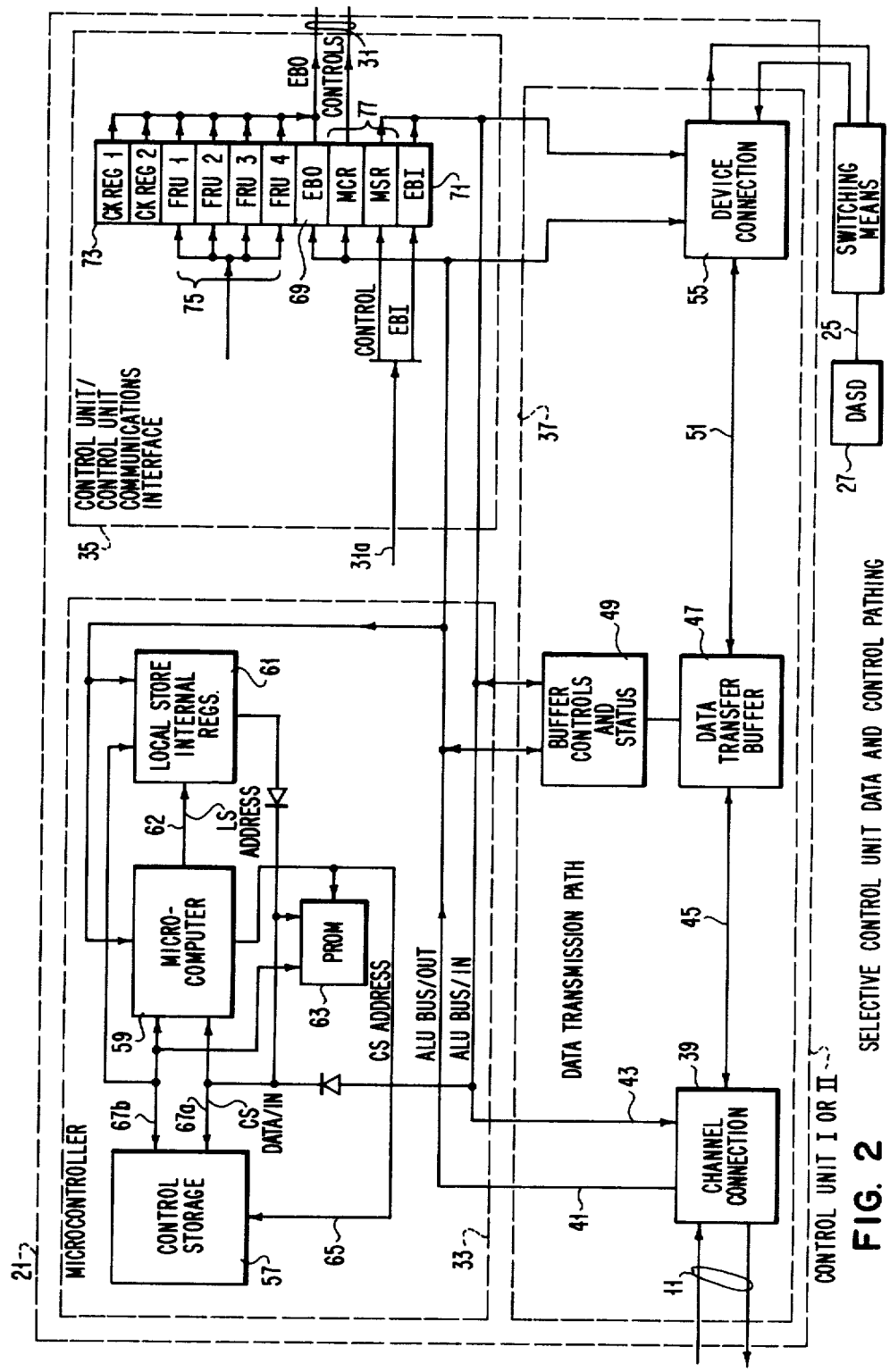
FIG. 2 sets forth the functional logic for selective control unit data and control pathing including register detail of the control unit/control unit interface.

Referring now to FIG. 2 there is shown a logical function diagram of either of the control units depicted in FIG. 1. Each control unit comprises a microcontroller 33 including a microcomputer 59 and its associated microcode contained in control storage 57. The microcode regulates the channel/control unit interface through the channel connection 39 and the control unit/device interface through device connection 55 and the CU/CU interface through element 35.

The control unit further includes a data transmission path 37 for providing a through data connection from the channel/control unit interface to the control unit/device interface without the need for microcontroller intervention once the path has been established. It should be pointed out that data transfer, in addition to interface switching can be accomplished by a microcontroller as well as a dedicated transfer path. When data transfer is performed by a microcontroller than such a configuration typically requires a highly parallel (horizontal) microcomputer as distinguished from a serial (vertical) computer. The present control unit configuration uses a dedicated transfer path and a vertical microcomputer. This is shown as illustrative of the setting within which invention can reside. In this embodiment, the data transmission path includes a data transfer buffer 47 coupling the channel connection 39 and the device connection 55 over respective paths 45 and 51. The buffer may be of the cyclic FIFO type with independent asynchronous store and fetch operation managed by buffer controls and status element 49 which in turn is respectively coupled to ALU bus/out and ALU bus/in.

The microcontroller 33 should be oriented towards direct control of devices and interfaces in real time. It preferrably should have a minimum number of interrupt levels (3 or 4) and directly addressable register architecture. This is exemplified by a local store internal register 61, accessed over LS address line 62 from microcomputer 59.

The control storage 57 contains microcode routines and control information used by the microprogram. It is addressed by microcomputer 59 over paths 65 with data from ALU bus/in 43 being moved into either control store 57 or microcomputer 59 over path 67a. Data is moved out of control storage over path 67b PROM 63 may be utilized to provide an initial microcode loader bootstrap program for loading microcode sequences into control storage 57 from an external source such as a diskette. Alternatively, such a PROM may also contain diagnostic programs suitable for self testing the microcontroller as described, for example, in Mock, U.S. Pat. No. 3,940,744, "Self Contained Program Loading Apparatus".

Figure 3:
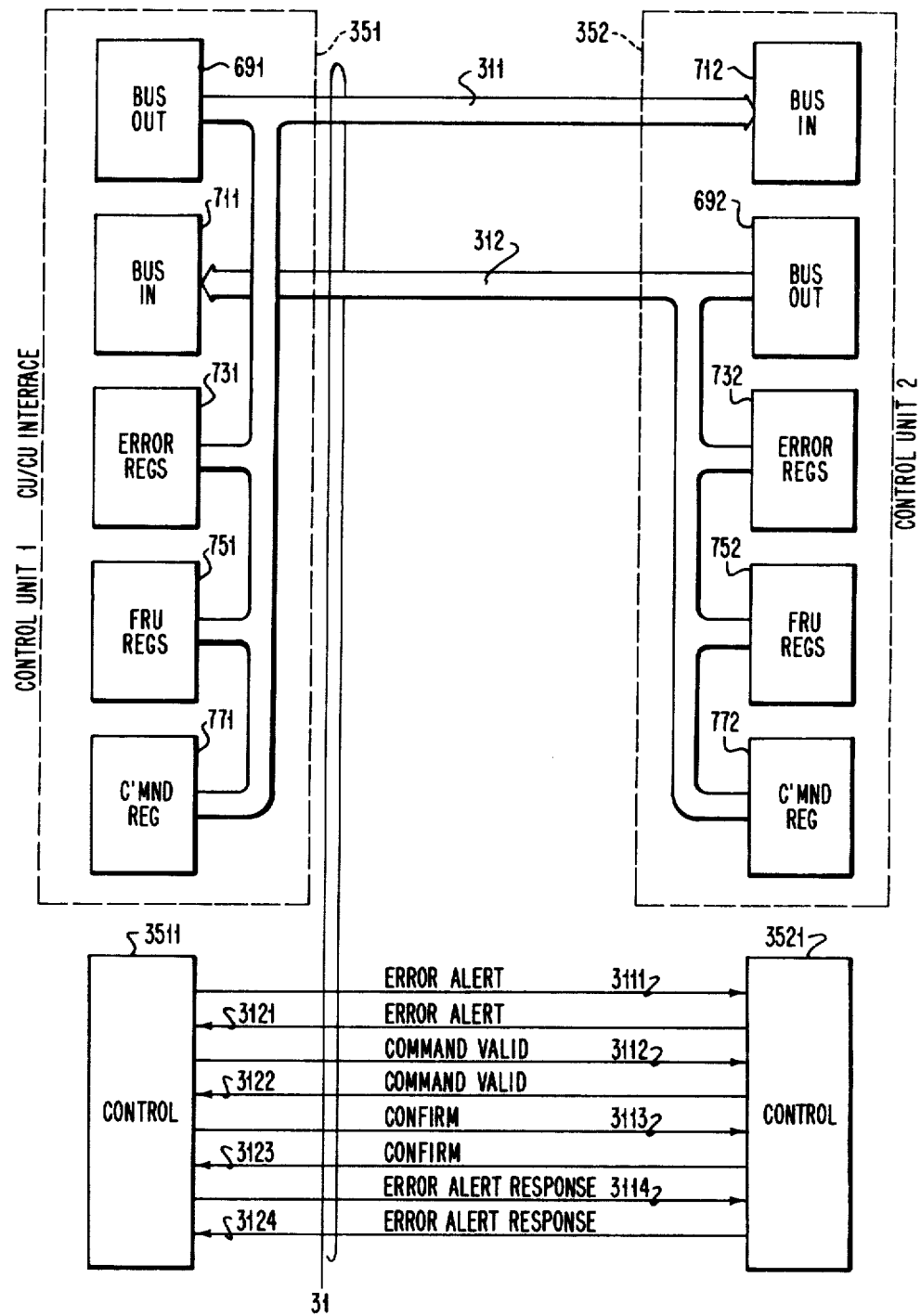
FIG. 3 emphasizes the bus and tag line assignments for the demand/response type control unit/control unit interface.

Referring to FIG. 2 taken together with FIG. 3, the control unit/control unit (CU/CU) interface 35 constitutes an asynchronous demand/response communication facility between control units and serves to collect selected error and failure data in registers. In this regard, control unit 21 contains register set 351 and tag line controls 3511. Control unit 23 contains register set 352 and tag line controls 3521. The external bus out (EBO) from register set 351 to register set 352 is over path 311 while the external bus in (EBI) to control unit 1 is over path 312. Register set 351 includes error registers 731, bus/in and bus/out registers 711 and 691, field replaceable unit (FRU) register 751 and command registers 771, multi drop connected to the EBO path 311. Similarly, register set 352 includes error registers 732, bus/in and bus/out registers 712 and 692, FRU registers 752, and command registers 772 are multi drop connected to path 312 which terminate in the EBI register 711 of register set 351. The error register set 73 (731 or 732) would typically consist of a byte wide format of dedicated bit positions whose contents would indicate the presence or absence of an error in a preselected portion of the control unit. For example, in check register 1 several predetermined bit positions might respectively reflect the parity or check condition of the ALU BUS OUT 41, the parity check condition of addressable registers, 61, or the parity check on data leaving the control store 57. The bit positions in the byte wide contents of check register 2 include those of invalid sequence checks, the data/in check on path 67a, etc. Similar conditions hold for the contents of the FRU registers 1–4. For example, four bit positions might indicate which of four register groups was selected at the time a check condition occurred.

The CU/CU path 31 assists in the peer coupling of check, status, and FRU information to the system via the alternate control unit. This path is used when a defaulting control unit is unable or potentially unable to successfully complete the check reporting to the system via its own attached channels. To accomplish communication, outbound control signals from one control unit are gated to the inbound control signals of the other control unit. This is depicted at the bottom of FIG. 3. Here the control interfaces 3511 and 3521 are connected by two sets of four control lines each with the lines in each set polled in the same direction. Thus, the set of lines connecting control 3511 to 3521 include ERROR ALERT 3111, COMMAND VALID 3112, CONFIRM 3113, and ERROR ALERT RESPONSE 3142. An oppositely polled set connects control 3521 to 3511. This includes ERROR ALERT 3121, COMMAND VALID 3122, CONFIRM 3123, and ERROR ALERT RESPONSE 3124.

The contents of control register MCR indicate whether any of the tag lines out from the interface are active or raised. The sense register MSR indicates activity on the bus registers. The EBO register contains either command or data information which is validated by the raised COMMAND VALID TAG LINE. The EBO register bits are gated to the external bus out at all times except when gating out check and FRU data. Note that predetermined bit positions of data in the EBO register determine if the information is either a command or data.

Figure 5:
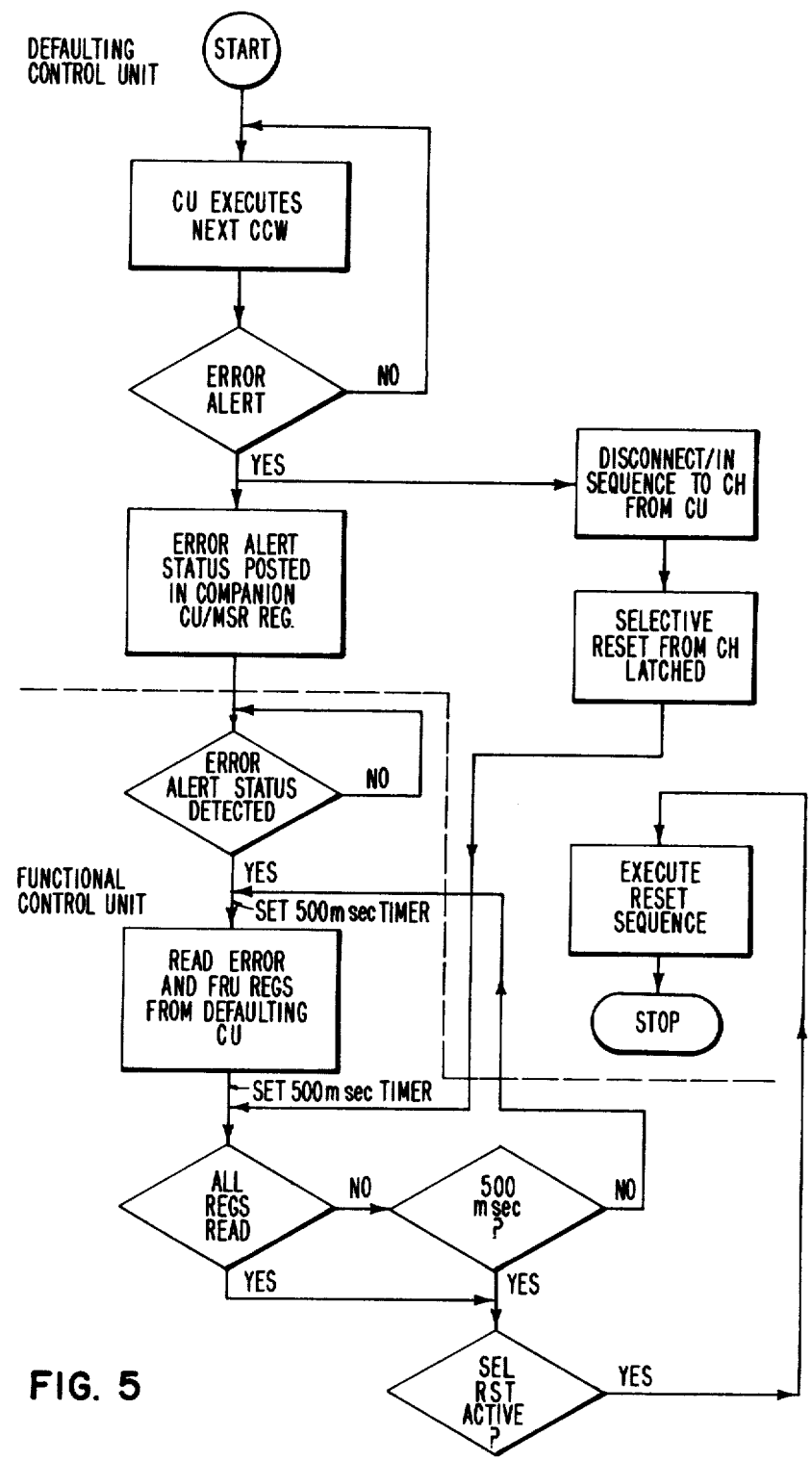
FIG. 5 sets forth a flow diagram of the activities performed by the defaulting and functional control units in respect of responding to a trouble signal and offloading the non-logged data from the defaulting control unit.

Referring now to FIG. 5, there is shown a sequence for the interface response to the occurrence of an error of the class stored in either of the error check register, the FRU registers storing data for subsequent maintenance use. First, the ERROR ALERT IN is raised and communicated to the alternate control unit by setting a predetermined bit in an external register. At the same time the DISCONNECT IN sequence generated by channel connection 39 is activated. Upon detection of the ERROR ALERT IN by the alternate control unit, the check, status, and FRU information is offloaded under control of the alternate control unit. This is done by the alternate control unit placing a coded pattern on EXTERNAL BUS OUT and raising the tag line COMMAND VALID. The defaulting control unit respond by placing the registered contents on EBO and raising the CONFIRM TAG LINE. The alternate control unit respond by dropping COMMAND VALID.

When all of the information has been offloaded, the alternate control unit raises the ERROR ALERT RESPONSE TAG LINE. The defaulting control unit latches this signal and initiates the RESET sequence as soon as it is received from the channel. A 500 millisecond timer is started when the ERROR ALERT is raised and then restarted each time a COMMAND VALID TAG LINE is raised. When the functioning alternate control unit raises ERROR ALERT RESPONSE IN or 500 milliseconds has elapsed between the start ERROR ALERT or between successive COMMAND VALID PULSES, then the ERROR ALERT RESPONSE IN line is activated which sets a latch. When both conditions are present (i.e. SELECTIVE RESET and ALLOW DISCONNECT IN) then RESET SEQUENCE is initiated.

Figure 4:
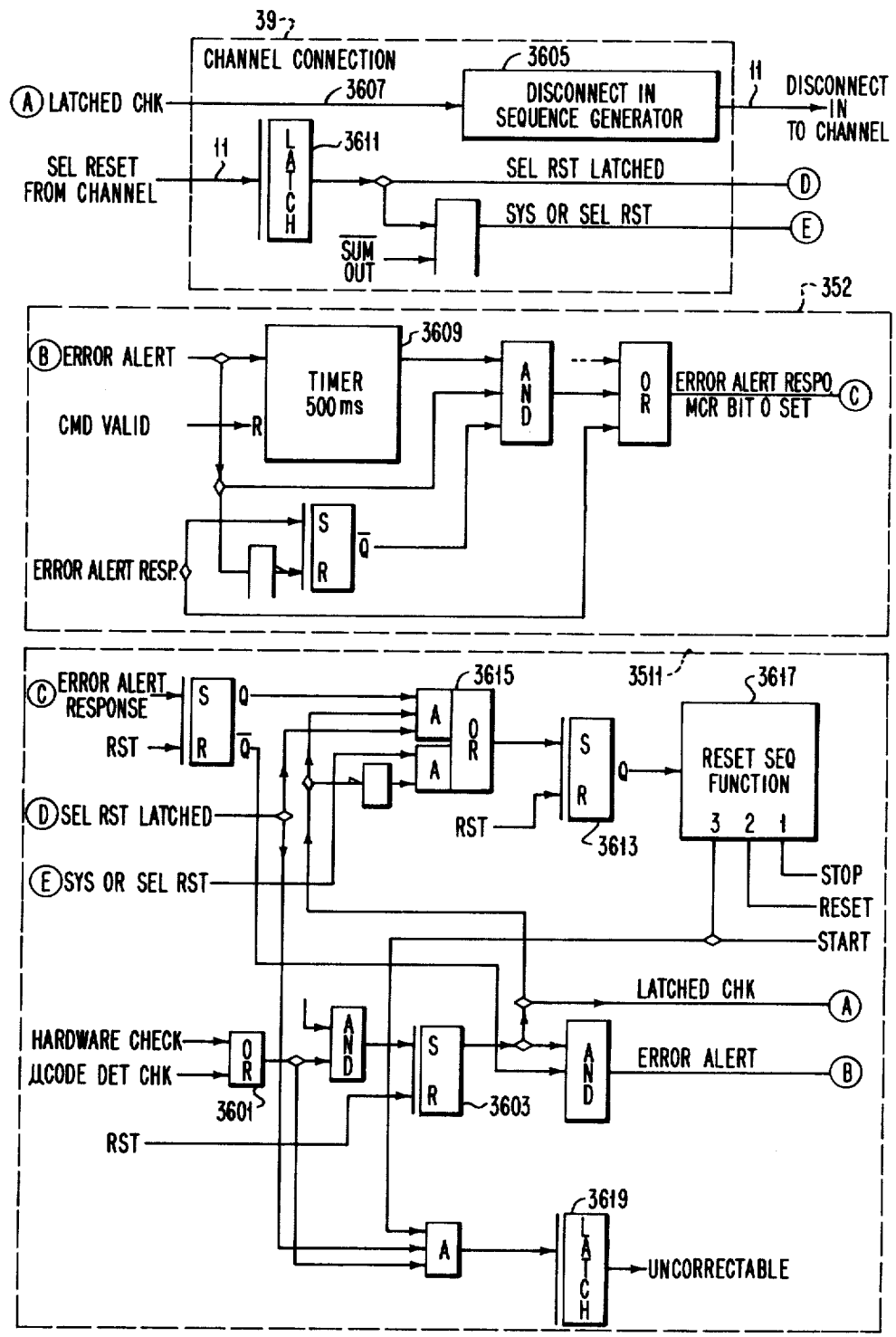
FIG. 4 exhibits the logic within a defaulting control unit for the invocation and processing of a trouble signal (error alert).
Figure 6:
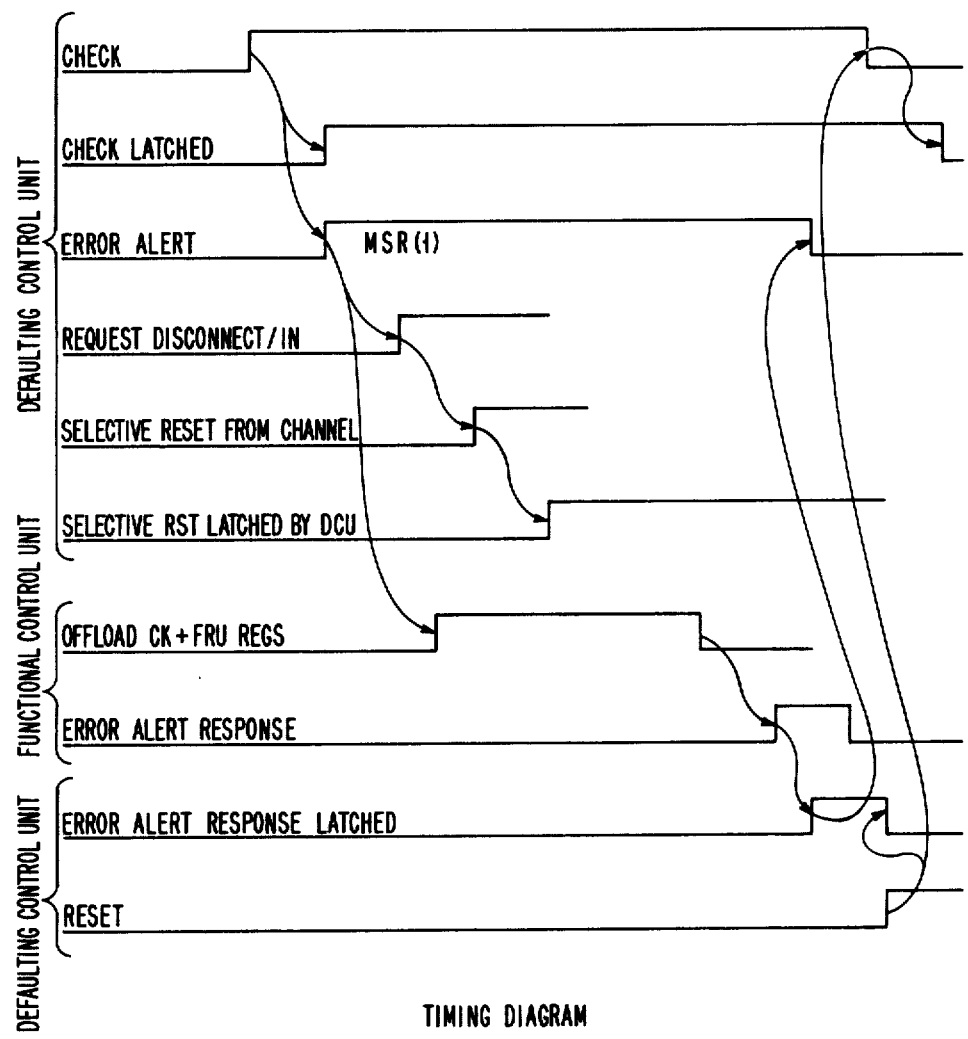
FIG. 6 is a relative timing diagram of the principal control functions described in FIG. 1-5.

Referring now to FIGS. 4 and 6 there is shown a hardware logic for implementing the ERROR ALERT processing and a timing sequence diagram indicative of the principal responses by both the defaulting and operable control units to the gated check and the error alerts. In this regard a recapitulation may be of assistance.

Referring now to FIG. 4 there is shown the logic for ERROR ALERT processing. The occurrence of either a predetermined hardware check or microcode detected check is latched up in flip-flop 3603 through appropriate check signal lines terminating in OR gate 3601. The output of flip-flop 3603 is duplicated respectively as LATCHED CHECK SIGNAL A and ERROR ALERT SIGNAL B. The LATCHED CHECK SIGNAL is applied to channel connection 39 in order to drive the DISCONNECT IN sequence generator 3605 over path 3607. The output of this generator constitutes the request DISCONNECT IN to channel 11. The ERROR ALERT B is applied to the interface portion of the defaulting control unit 352 where it initiates in the functional control unit a 500 millisecond timer 3609 and the posting of the status by the setting of an appropriate bit in the MSR register.

The request for DISCONNECT IN is responded by the channel with a SELECTIVE RESET. This is registered up by latch 3611. There is produced two signals D and E indicative of either SELECTIVE RESET LATCH or SYSTEM OR SELECTIVE RESET. Signals C, D or E cause flip-flop 3613 through combination logic means 3615 to be set.

Since the ERROR ALERT causes a MSR register bit to be set, then the microcode in the functional control unit is able to sample this bit. This sequence causes the information in each ERROR and FRU REG to be transferred across the BUS OUT to the functional control unit where it is stored in control store 57. When the sequence is complete, the functional control unit respond by activating ERROR ALERT RESPONSE. When both signals C and D have been activated, then the RESET SEQUENCE is started. This is due to the resetting of flip-flop 3613 and the initiation of the reset sequence function 3617. As may be appreciated, the RESET SEQUENCE involves stopping the clock in the microcomputer, pulsing the reset line and pulsing the start line. The RESET will clear the check condition. If during the time between the occurence of a start and end SELECTIVE RESET LATCH, another check condition is detected, then the latch 3619 indicative of an uncorrectable condition is invoked.

It should be noted that the ERROR ALERT LINE is activated by a failing CPU when an error condition has been detected. The functional CU having a multi level interrupt microcontroller polls its status registers (MSR) when it is in a wait loop (lowest interrupt level). Upon the functional control unit detecting this condition, the CU/CU communications path is established. Error data and FRU information may now be transmitted to the functional control unit and recorded in the control store. They are transferred from the functional control unit when said unit is accessed by a channel implementing a START/IO. This is implemented by commands being placed on the bus out of the functional control unit. The commands specify which hardware register contents are to be placed on the bus in. The bus out is valid when the COMMAND VALID is active.

Commands are received from the functional control unit and hardware decoded to gate the specified register contents on the bus out of the defaulting control unit. The bus in of the defaulting control unit is not valid until the COMMAND VALID from the functional control unit is raised. Once the bus in is decoded and the data requested is placed on the defaulting control units bus out, then the CONFIRM TAG LINE is activated by the defaulting control unit in order to signal the functional control unit that the data requested is on the bus.

The COMMAND VALID tag is used to validate command information placed on BUS OUT of the functional control unit. The COMMAND VALID is reset with a response from the defaulting control unit which activates the CONFIRM tag line when the command has been decoded and requested data has been placed on the defaulting control units bus out.

The CONFIRM TAG LINE is used to validate data placed on bus out of the defaulting control unit. The tag line is reset when the request for more data such as by raising COMMAND VALID or by the functional control unit activating ERROR ALERT response. Lastly, the functional control unit transmits the collected error and FRU data to its CPU/channel during normal SENSE CHANNEL SEQUENCES. The CPU/channel places this data with other logged data in order to provide a history of failure information and also to provide more accurate data as to what component within the control unit conditions the default.

While the invention has been particularly shown and described with reference to preferred embodiments thereof, it will be understood by those skilled in the art that interfaces other than asynchronous demand/response between the control units could be used. The foregoing and other changes in form and details may be made therein without departing from the spirit and scope of this invention.

Having thus described our invention, what we claim as new and desire to secure by Letters Patent is:

1. A method for the automatic recovery of data from a defaulting one of a pair of failure independent control units, each control unit having means for switchably interconnecting channel to device interfaces, means for the registration of its error state, and a control unit/control unit communications interface, each interface being of the asynchronous demand/response type, the method steps comprising:
notifying a channel accessing the defaulting control unit of its unavailability responsive to a trouble signal originating within said defaulting control unit concurrent with notifying the companion control unit of this status;
peer coupling data from the defaulting control unit to a channel interface coupling the companion control unit through and under the control of the companion control unit over the communications interface responsive to the unavailability status indication; and
buffering any accessing channel response at the defaulting control unit to the unavailability notification until said data has been offloaded subsequent to which the channel response may be executed.

2. A method according to claim 1, wherein the channel to which data is peer coupled is terminated in the same CPU as the channel accessing the defaulting control unit.

3. A method according to claim 1, wherein the data is of the non-logged error type.

4. A method according to claim 1, wherein the step of notifying the accessing channel includes activating a DISCONNECT IN sequence by the defaulting control unit, the accessing channel response to the unavailability notification being that of a SELECTIVE RESET;
the step of notifying the companion control unit includes that of setting an appropriate status bit in the error registration means.

5. A method according to claim 1, wherein the step of peer coupling data includes the steps of
polling the error registration means and upon detection of the unavailability status causing the data in the defaulting control unit to be moved through the communications interface to the channel interface coupling the companion control unit.

6. A method for the recovery of non-logged error data by a CPU/channel from a storage subsystem, which data would normally be overwritten upon the subsystem or portion thereof being RESET by the CPU/channel, said subsystem comprising a pair of failure independent control units, each control unit having means for switchably interconnecting channel to device interfaces, means for the registration of its error state, and a control unit/control unit communications interface, each interface being of the asynchronous demand/response type, the method steps comprising
notifying a CPU/channel accessing the defaulting one of a control unit pair of its unavailability responsive to a trouble signal originating within said defaulting control unit concurrent with notifying the companion control unit of this status, said step of concurrent notification further including the steps of initiating a DISCONNECT IN sequence to the accessing channel and setting an appropriate status bit in the error registration means of the companion control unit;
peer coupling data from the defaulting control unit to a CPU/channel interface coupling the companion control unit through and under the control of the companion unit over the communications interface upon the companion control unit polling the status bit; and
buffering any accessing channel response at the defaulting control unit to the unavailability notification until said data has been offloaded, subsequent to which, the channel response may be executed such that the accessing channel responsive to the DISCONNECT IN sequence with a SELECTIVE RESET having said reset honored after the offloading by erasing all data in the defaulting control unit.

* * * * *